United States Patent [19]
Harmsen

[11] Patent Number: 4,813,379
[45] Date of Patent: Mar. 21, 1989

[54] PASSAGE DEVICE FOR CATTLE

[75] Inventor: Jan H. Harmsen, Hengelo, Netherlands

[73] Assignee: N.V. Nederlandsche Apparatenfabriek NEDAP, De Groenlo, Netherlands

[21] Appl. No.: 151,605

[22] Filed: Feb. 2, 1988

[30] Foreign Application Priority Data

Feb. 2, 1987 [NL] Netherlands ......................... 8700243

[51] Int. Cl.⁴ ............................................ A01K 29/00
[52] U.S. Cl. ......................................... 119/155; 49/49
[58] Field of Search .................... 49/49, 372; 119/155, 119/20, 82

[56] References Cited

U.S. PATENT DOCUMENTS

| 3,079,711 | 3/1963 | Turner | 49/49 |
| 3,222,805 | 12/1965 | Hansen | 49/49 |
| 3,874,118 | 4/1975 | Robinson | 49/402 |

FOREIGN PATENT DOCUMENTS 0095214 11/1983 European Pat. Off. .

Primary Examiner—Robert Peshock
Attorney, Agent, or Firm—Fleit, Jacobson, Cohn & Price

[57] ABSTRACT

A passage device for cattle comprising an opening closeable by two doors hinged around vertical hinge axes on either side of the opening. As viewed from the space accessible via the passage device, one door is openable only outwardly and the other door only inwardly.

17 Claims, 4 Drawing Sheets

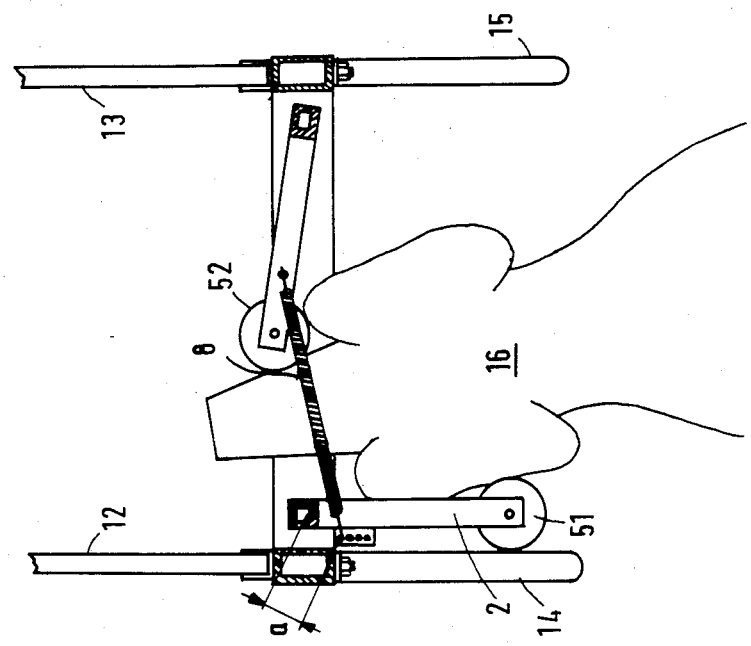
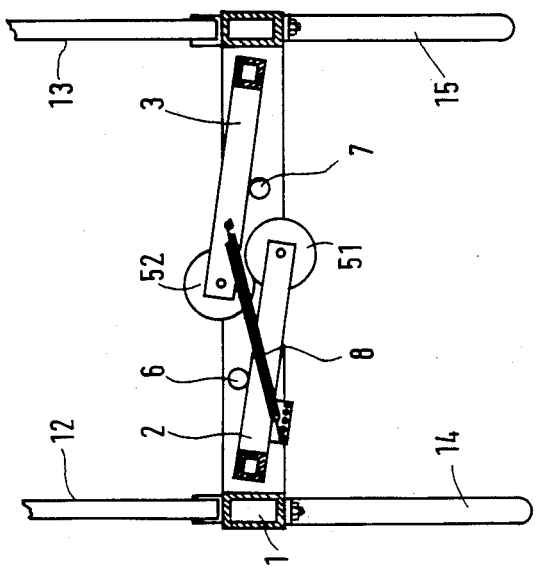
FIG.3
FIG.2

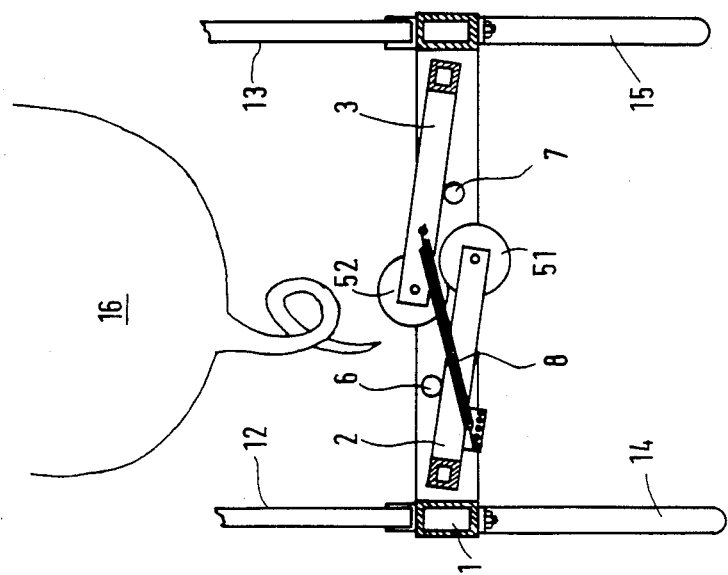
_FIG.7_
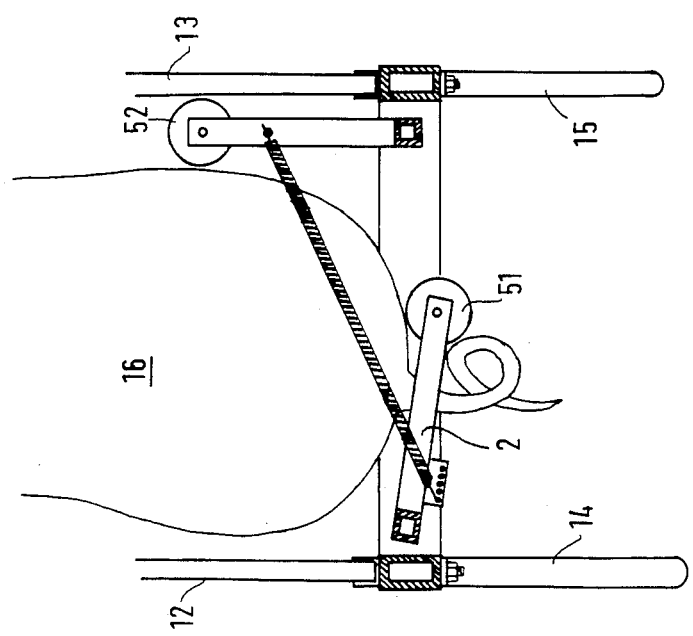
_FIG.6_

PASSAGE DEVICE FOR CATTLE

This invention relates to passage device for cattle, comprising an opening closable by two doors hinged around vertical hinge axes on either side of the opening.

Such a passage device is described as an access to a feeding station for cattle in European patent application No. 0095214.

The known passage device for cattle comprises two (half-) doors hinged around vertical hinge axes on either side of the opening, through which a feeding trough in the feeding station can be reached.

It is known that animals, and especially pigs, try to push each other aside when being fed and in the known feeding station it is difficult to prevent two or more animals from trying to simultaneously enter the station through the access opening. In that case, an undisturbed eating is excluded: thus, unrest arises in the feeding station and the animals may injure each other.

It is an object of the present invention to provide a passage device arranged in such a manner that only one animal has access. Such a passage device is suitable in particular for use in feeding stations for e.g. pigs, but can be used also in other situations, e.g. when separating cattle.

According to the present invention, a passage device of the above described type is characterized in that, as viewed from the space accessible through the passage device, the one door can be opened only ontwardly and the other door only inwardly.

One embodiment of the present invention will now be described, by way of example, with reference to the accompanying drawings, in which:

FIG. 2 is a top view of a passage device according to the present invention; and FIGS. 3–7 are diagrammatic top views and a side view (FIG. 5) of the manner in which an animal can pass a passage device according to the present invention.

Figure 1:
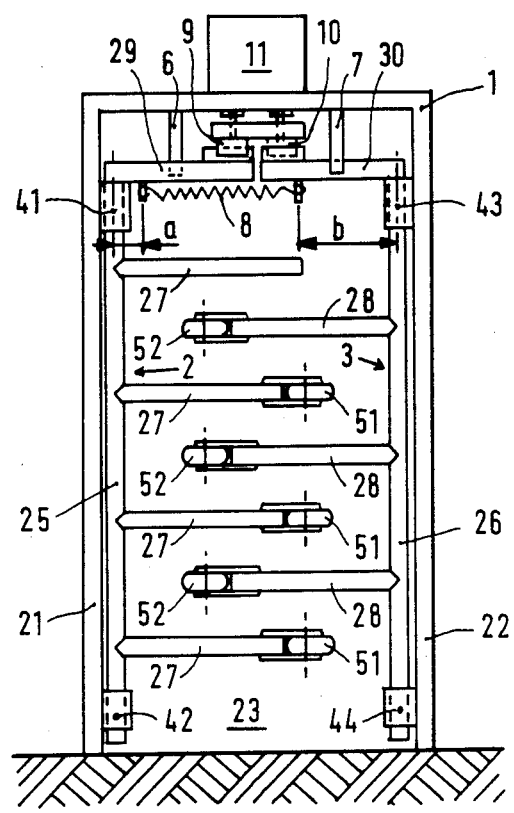
FIG. 1 is a diagrammatic front view of an embodiment of a passage device according to the present invention.

FIG. 1 is a diagrammatic front view of an embodiment of a passage device according to the present invention. The device shown comprises a steel frame 1 having two uprights 21, 22, bounding an access opening 23. The uprights in this embodiment are interconnected near their upper ends by a beam 24. To each upright there is attached a door 2, 3 hinged around a vertical axis. To that end, in this embodiment, each upright has two suspension points 4. In the rest position, doors 2, 3 jointly shut off the opening 23.

In the embodiment shown, the device is arranged in such a manner that the right-hand door 3 opens inwardly, while the left-hand door 2 opens outwardly. To that effect, the beam 24 has stops 6, 7 which prevent the left door from turning inwards and the right door from turning outwards. A similar effect can be obtained also differently, e.g. by providing suitable stops on the uprights, or by constructing the suspension points of the doors in such a manner that turning in one direction only is possible.

Doors 2, 3 can be constructed in many ways. As shown in the drawings, the doors can advantageously be constructed in a manner similar to that shown in EP-A-No. 0095214, wherein the doors each consist of a vertical tube 25, 26, which are mounted on the associated uprights for pivotal movement around a vertical hinge axis and which each carry a plurality of interspaced horizontal tube sections 27, 28. Tube sections 27, 28, as shown, are preferably installed at different heights and extend beyond the middle of the access opening 23, so that the doors overlap one another so to speak. The horizontal tube sections of each door, in the embodiment shown, are not interconnected at the ends away from the associated vertical tube, and further carry guide rollers 51, 52 at the free ends, at least in the region where the animals may come into contact with the horizontal tube sections. Said guide rollers are adapted to roll along the body of a passing animal and prevent injuries of the animal.

The use of overlapping doors results in that only one animal can pass the access opening at a time and also makes it possible for an animal to return half-way the passage of the access opening, without becoming seized between the doors.

On the doors a resetting force is acting, which urges the doors into the rest position shown in FIG. 1. The resetting force may e.g. be the force of gravity. In that case, e.g. the suspension points of the doors may be provided with run-on lugs, as shown in EP-A-No. 0095214.

The resetting force can be obtained also by using suitable springs, optionally in combination with gravity.

It has been found to be advantageous when the resetting force acting on the door turning inwardly exceeds the resetting force acting on the door turning outwardly.

The resetting force urges the doors against stops 6, 7. In the embodiment shown, upper cross tubes 29, 30 are provided on each door for coaction with stops 6, 7. Besides, latches 9, 10 may be provided, which are advantageously remotely and/or automatically controlled. In the embodiment shown, a lifting device 11 is adapted to lift latches 9, 10. The lifting device is controllable in any manner known therefor: electrically, electromagnetically, mechanically, pneumatically, hydraulically, etc. The control may take place e.g. by a computer program.

The operation of the device is as follows: When the doors are not locked by latches 9, 10, e.g. in case no animal is present in a feeding station positioned behind the passage device, the doors are kept closed by the resetting force.

The stops of the doors are provided, as shown in FIG. 2, in such a manner that the door 2 opening outwardly is opened already over a very small distance, so to say, so that an animal 16 can open the door further with its snout, to gain access. This situation is shown in FIG. 3. The animal then pushes the second door 3 inwards and is on its way to the space therebehind (e.g. a feeding station). This space is preferably dimensioned in such a manner that only one animal can be contained therein. At 12 and 13 side walls of a feeding station or a different space are shown.

When the animal passes through the passage device, the first door, which slides along the animal's body, is screened by it in such a manner that a second animal has no grip on it on the side where the first animal is present. To prevent a second animal from arriving at the exterior of the door, there can be provided an additional partition or fensing substantially perpendicular to the opening plane of the passage device. Such a screen is indicated at 14.

The inwardly-opening door 3, too, is adequately protected by the animal's body against undesirable operation by a competitor during the passage of the entering animal. Here too, an additional partition or fencing may be provided, as mentioned hereinbefore, but then on the other side of the passage device. Such a screen is indicated at 15.

After the passage of the animal, successively the outwardly and inwardly turning doors can be locked when their stops are reached again by means of the latches 9, 10, thereby blocking access to other animals. Only when the animal has finished eating (in the example of a feeding station) or when the animal is not entitled to get food, are the latches unlocked again, so that a following animal can gain access.

In a preferred embodiment of the present invention, the doors are interconnected by a tension spring 8, providing the above mentioned resetting force. Advantageously, the points of application of the tension spring on the doors are different, as shown. On the outwardly turning door 2, the point of application is close to the hinge axis (distance (a), see FIG. 1), so that a relatively small force is sufficient to open this door.

The other spring end, however, has a point of application relatively far away from the hinge axis of the inwardly opening door 3 (distance (b), see FIG. 1). By virtue of this particular positioning of the points of application, it is achieved that the inwardly turning door will exert, through the tension spring, an increasingly large closing force on the outwardly turning door. The latter is thus closed immediately behind the passing animal, thereby effecting a good separation between two successive animals. As mentioned hereinbefore, such a separation is not only important for allowing undisturbed eating of the animal where it is used in a feeding station, but it is also highly important for other applications. One conceivable example is a separating device for cattle, wherein, after an animal has gained access, through a passage device according to the present invention, to a space therebehind, the animal is recognized e.g. electronically, after which either of two or more doors can be opened through computer control towards separated spaces wherein the animals are to be isolated from the group. Examples are pregnant or sick animals.

FIG. 3 shows how a pig 16 has already opened door 2 with its snout. This is easy, because spring 8 is tensioned only slightly and moreover the distance (a) is only small.

Figure 4:
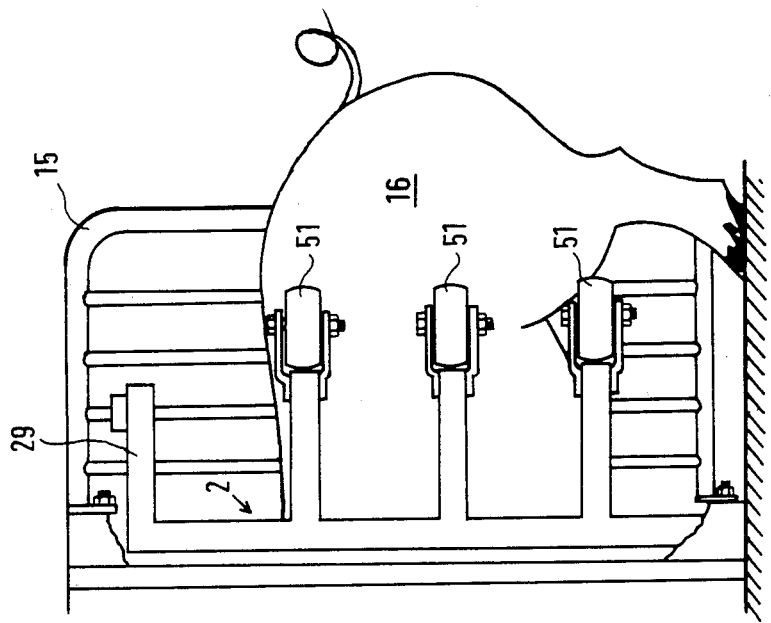

In FIG. 4, the animal has passed the passage device already substantially and, to that end, had to open also door 3. Due to the relatively large distance (b), spring 8 has now arrived at its maximum tension, so that rollers 51, 52 of the doors roll closely along the pig's body.

Figure 5:
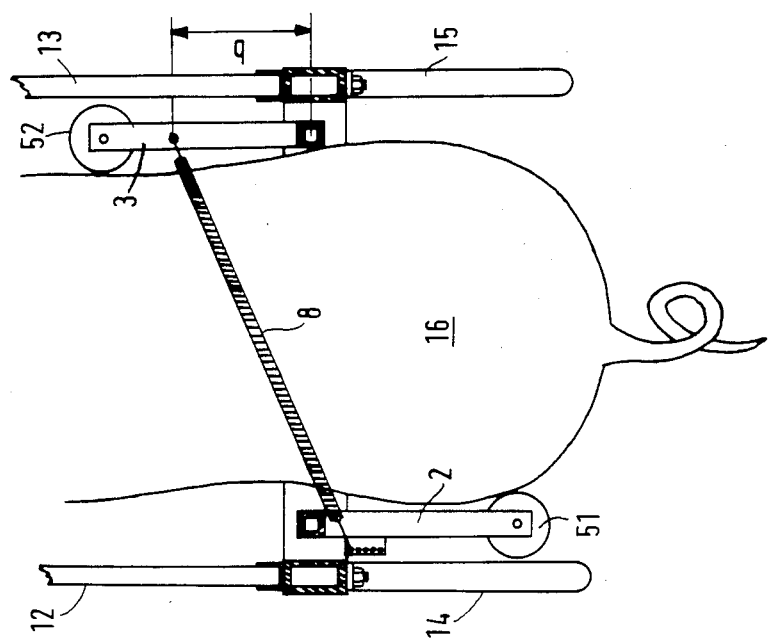

FIG. 5 is a side view of the situation shown on FIG. 4, wherein the partition or fencing 15 is clearly shown.

FIG. 6 shows the situation when the pig has almost passed the passage device, roller 51 of door 2 has rolled along the animal's body and is again in the initial position of FIG. 2, after which locking can take place by means of latch 9.

In FIG. 7 the pig has entirely passed the passage device and also door 3 is again in the starting position, wherein it can be locked by means of latch 10. Doors 2 and 3 are now both locked; a following animal cannot be admitted until the locking has been removed by means of device 11.

I claim:

1. A passage device for cattle comprising a frame bounding an access opening closable by two doors hinged around vertical hinge axes relative to said frame on either side of the opening, wherein one door is openable by the cattle in the direction in which cattle passes through the access opening and the other door is openable in the opposite direction by the cattle.

2. A passage device as claimed in claim 1, characterized in that the doors each comprise a substantially vertical tube carrying a plurality of spaced apart, horizontal tube sections extending into the opening.

3. A passage device as claimed in claim 1, characterized in that the doors are provided with rollers adapted to engage the body of a passing animal.

4. A passage device as claimed in claim 2, characterized in that the horizontal tube sections have free ends provided with rollers.

5. A passage device as claimed in claim 1, characterized in that the doors have a larger width than half the width of the opening and overlap one another.

6. A passage device as claimed in claim 1, characterized in that one of said doors is an outwardly opening door and one of said doors is an inwardly opening door, and in that the outwardly opening door, in the closed position, is already slightly turned outwardly, allowing an animal to further open this door with its snout.

7. A passage device as claimed in claim 1, characterized in that there are provided resetting means exerting on the two doors a resetting force for urging the doors into the closed position.

8. A passage device as claimed in claim 7, characterized in that the resetting force is provided at least partly by gravity.

9. A passage device as claimed in claim 7, characterized in that the resetting force is provided at least partly by spring means.

10. A passage device as claimed in claim 7, characterized in that one of said doors is an outwardly opening door and one of said doors is an inwardly opening door, and in that the resetting means are arranged to exert a larger resetting force on the inwardly opening door than on the outwardly opening door.

11. A passage device as claimed in claim 9, characterized in that one of said doors is an outwardly opening door and one of said doors is an inwardly opening door, and in that the spring means comprise a common tension spring mounted between a first point on the outwardly opening door and a second point on the inwardly opening door.

12. A passage device as claimed in claim 11, characterized in that one of said doors is an outwardly opening door and one of said doors is an inwardly opening door, and in that the distance between the first point and the hinge axis of the outwardly opening door is smaller than the distance between the second point and the hinge axis of the inwardly opening door.

13. A passage device as claimed in claim 1, characterized by at least one screening member linking up with the opening and extending substantially transversely to the plane of the opening.

14. A passage device as claimed in claim 1, characterized by remote controlled latch means having latches adapted to coact with each door.

15. A passage device as claimed in claim 1, characterized in that the access opening is an opening to a feeding station for cattle providing room for one animal at a time.

16. A passage device as claimed in claim 1, characterized in that a space accessible via the passage device has a separate remote controlled exit door.

17. A passage device as claimed in claim 1, characterized in that a space accessible via the passage device has two or more separately controlled exit doors, allowing for an animal to be conducted to a desired space in a controlled manner.

* * * * *